Oct. 25, 1932. I. KITROSER 1,884,994
METHOD AND APPARATUS FOR CAUSING THE RETICULATION AND CLOUDY
EFFECTS IN GOFFERED FILMS IN COLORS TO DISAPPEAR
Filed July 31, 1929
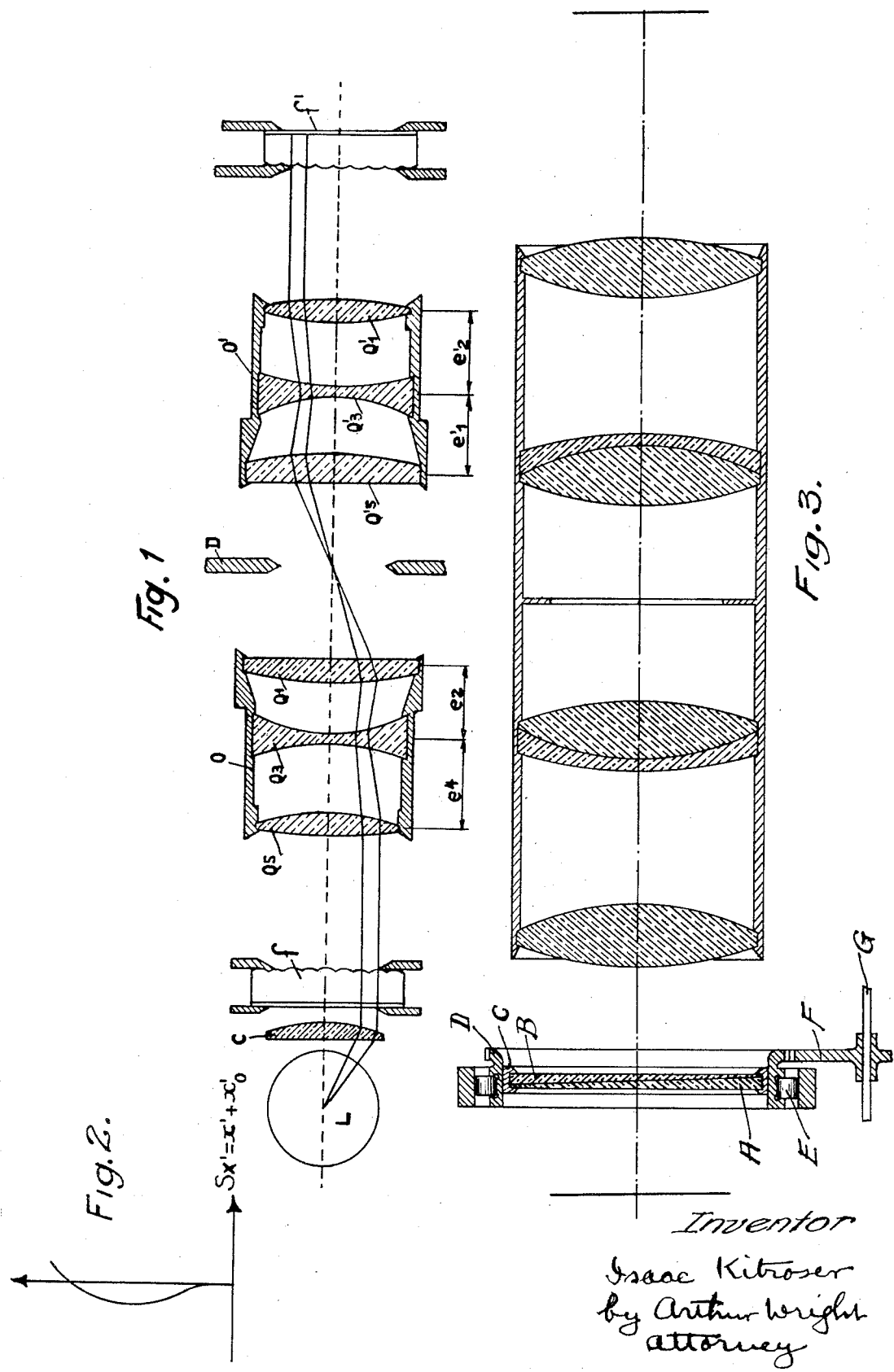
Inventor
Isaac Kitroser
by Arthur Wright
attorney Patented Oct. 25, 1932

1,884,994

UNITED STATES PATENT OFFICE

ISAAC KITROSER, OF PARIS, FRANCE, ASSIGNOR, BY MESNE ASSIGNMENTS, TO KELLER-DORIAN COLORFILM CORPORATION, OF NEW YORK, N. Y., A CORPORATION OF DELAWARE

METHOD AND APPARATUS FOR CAUSING THE RETICULATION AND CLOUDY EFFECTS IN GOFFERED FILMS IN COLORS TO DISAPPEAR

Application filed July 31, 1929, Serial No. 382,381, and in France August 9, 1928.

In the French Patent No. 571,096, of December 4, 1922, I describe a method and apparatus for eliminating cloudy effects during reproduction and reticulation apparent during projection with goffered films by means of retracting miscroscopic elements.

I pointed out in the above mentioned patent the conditions which the reproducing objective must fulfill in order that the cloudy effects do not become manifest during reproduction. I showed that in order to cause the cloudy effects to disappear the engraving must be such that each lenticular element is smaller than the definition of the reproducing objective.

According to my present invention I start with a given goffering and I modify the construction of the reproducing objective, this being done in such a way that the definition thereof will be substantially the diameter of the imposed lenticular elements.

For this purpose I may either act on the objective itself or adopt an optical arrangement independent of the objective which gives the desired tone. Now in order to cause the cloudy effects to disappear it is not sufficient to produce any sort of tone. The exact conditions resides in the fact that the image of a luminous point infinitely small given by the reproducing objective must be a luminous disk having a diameter substantially equal to the diameters of the lenticular elements whether it be a question of picot goffering with spherical diopters or lign goffering with cylindrical diopters. The said luminous disk must have a distribution of light which is absolutely uniform and the tone must be the same throughout the extent of the image reproduced.

For this purpose I have devised an objective which possesses the property of giving good images while at the same time provides a tone which satisfies the conditions above pointed out.

The invention will be more readily understood in the following description when taken in connection with the accompanying drawing forming part of this specificaton and in which—

Fig. 1 is a diagrammatic sectional view illustrating my apparatus in a conventional way;

Fig. 2 is a diagram of a curve.

And Fig. 3 is a longitudinal section showing diagrammatically a lens arrangement having associated therewith a rotating prism for eliminating moiré effects, etc.

Referring to the drawing more in detail, D represents a diaphragm and O, O' two identical parts of an objective symmetrically disposed on the opposite sides of said diaphragm. The part O consists of the bi-convex lens $Q_5$, a bi-concave lens $Q_3$ and a plano-convex lens $Q_1$. The part O' is comprised of lenses $Q'_5$, $Q'_3$ and $Q'_1$ identical to the lenses $Q_5$, $Q_3$ and $Q_1$. The end lenses of part O are disposed respectively at distances $e_4$ and $e_2$ from the central lens and the lenses of member O' are disposed in similar fashion at the respective distances $e'_4$ and $e'_2$.

At $f$ is indicated the origin goffered film and at $f'$ the goffered virgin film.

L represents a source of light and C a condenser therefor.

With my objective I can correct all aberration and at the same time give the proper value to the spherical aberration curve. In fact, my objective being symmetrical and of unity magnifying power, chromatic enlarging aberration, coma and distortion are corrected automatically due to the lenses being symmetrical.

By employing calculations involving standard formula the various quantities as well as the distances $e_2$, $e'_2$ respectively for which the definition given by the objective will be substantially equal to the dimension of the elements of the goffering.

Thus according to the classical well-known formulæ, if $M_1$, $M_3$ and $M_5$ represent the inverse of the focal lengths of the objectives $Q_1$, $Q_3$ and $Q_5$ respectively per lens; $n_1$, $n_3$ and $n_5$ the indices of refraction; $V_1$, $V_3$ and $V_5$ the constringencies or dispersion respectively, $h_1$, $h_2$ and $h_3$ the height of incidence, the following formulæ may be used to calculate the power of the lenses in order to correct the objective for chromatic aberration of position; the Petzwal curve for a unity focus of the objective.

Where $$M_1 + h_3 M_3 + h_5 M_5 = 1 \quad \text{(focus=1)}$$

where $$M_1 = \frac{1}{I_1}, \quad M_3 = \frac{1}{I_3}$$

$$e_2 = \frac{1-h_3}{M_1} \quad e_4 = \frac{h_3 - h_5}{M_1 + h_3 M_3}$$

$$\frac{M_1}{V_1} + h_3^2 \frac{M_3}{V_3} + h_5^2 \frac{M_5}{V_5} = 0 \quad \text{(Chromatic aberration)}$$

$$\frac{M_1}{n_1} + \frac{M_3}{n_3} + \frac{M_5}{n_5} = P \quad \text{(Petzwal curve)}$$

The powers calculated from the foregoing will therefore correspond to any fixed value of $e_2$ and $e_4$.

I am thus able to correct for spherical and astigmatic aberration at will by means of the three curvatures, given the three optical members.

Spherical aberration thus corrected is represented in the form of a curve in Fig. 2 which will be readily recognized by those skilled in the art. The area represented by this curve depends essentially on the distance $e_2$ or rather the distance $h_3$. As shown in Fig. 2 the ordinate is represented by the height of intersection of the incident ray with the entry pupil or abscissa aberration.

I have observed that if $h_3$ increases, that is if a correction for spherical aberration Fig. 2 is to be obtained, $S_2$ (2nd sum of Zeidel) according to the classical well-known formulæ must be increased or decreased. If $h_3$ decreases, then the exact opposite is true. Now the clearness or definition of the image of the objective as corrected depends upon the aforementioned aberration area which changes with the magnitude of the 2nd sum of Zeidel. I calculate the objective, I analyze, and if the aberration area is not suitable I start again calculating with another value of $e_2$. By making two or three calculations I am able to interpolate and obtain the true distance of $e_2$ for which $S_2$ is such that the degree of indefinition given by the objective is substantially equal to the dimensions of the lenticular elements of the goffered film.

If the reproduction is to take place with an original and a virgin film having different goffering I establish a degree of indefinition substantially equal to the smallest of the lenticular elements of the two films.

It is even possible as an alternative to act by a means independent of the objective by displacing one of the films with respect to the other with a uniform movement during exposure and a distance equal to the size of an element either line or picot.

Between the reproducing objective and one of the films I may interpose an optical expedient, such as an achromatic prism or other suitable means, which deviates the image at a maximum a quantity equal to the size of an element of the goffering. During exposure said expedient is given a uniform movement of rotation. Any suitable means known to the art may be used for this purpose. The whole operates as if the objective were displaced and the point were to describe a circle. If the diameter of said circle is equal to the diameter of the lenticular elements, the proper degree of indefinition will be attained and the moiré effects will disappear.

The details of assembly and control do not come within the scope of my invention and have therefore not been illustrated except as shown in Fig. 3, the essential object of my invention being the creation of a degree of indefinition substantially equal to the dimension of the lenticular elements of the goffering either by determining the optical elements of the objective or by means of the action of an optical expedient independent thereof. In said figure I have shown a composite achromatic prism containing elements A and B and being made of crown and flint glass respectively, which is mounted in a rim C carried in an annular gear D supported in roller bearings E. The annular gear D is driven by a gear F mounted on a driving shaft G.

Having described my invention what I claim as new and desire to secure by Letters Patent is:

1. A method for eliminating undesirable effects appearing during reproduction of goffered films which comprises optically spreading the image of the film a distance substantially equal to the dimension of a goffered element of the film, and so transmitting the light as to necessitate the enlargement of a point into a curved outline whose dimension is substantially equal at least to that of the individual elements of the goffering while the objective is in focus.

2. An apparatus for eliminating cloudy effects and reticulations appearing during reproduction of goffered films comprising an objective of large definition, a rotatable optical means for deviating the image of said objective a distance substantially equal to the dimension of an element of the goffering, means for rotating said optical means whereby a point is transformed into a curved outline having a dimension substantially equal to that of an element of the goffering.

3. An apparatus for eliminating cloudy effects and reticulations appearing during reproduction of goffered films comprising an objective of large definition, a prism rotatable on the axis of the objective for deviating the image of said objective a distance substantially equal to the dimension of an element of the goffering, means for rotating said optical means whereby a point is transformed into a circle having a dimension substantially equal to that of an element of the goffering.

4. A method for eliminating undesirable effects appearing during reproduction of goffered films which comprises optically spreading the image of the film, by means of a diaphragm and a symmetrical objective including a three-lens system on each side of the diaphragm, a distance substantially equal to at least the dimension of a goffered element of the film, and so transmitting the light as to necessitate the enlargement of a point into a curved outline whose dimension is substantially equal at least to that of an individual element of the goffering while the objective is in focus.

5. An apparatus adapted to eliminate undesirable effects during reproduction of goffered films, which comprises a copying objective and an optical means for spreading the image of said objective transforming a point into a curved outline whose dimension is substantially equal to at least that of an individual element of goffering.

6. An apparatus for eliminating undesirable effects appearing during reproduction of goffered films comprising an objective, a prism rotatable on the axis of the objective for spreading the image of said objective, means for rotating the prism whereby a point is transformed into a curved outline eliminating moiré effects.

In testimony whereof I hereunto affix my signature.

ISAAC KITROSER.